L. H. PARKER.
METHOD OF DISTRIBUTING LIQUID.
APPLICATION FILED DEC. 17, 1917.

1,311,840.

Patented July 29, 1919.
2 SHEETS—SHEET 1.

Inventor:
Lee H. Parker.
by Emery, Booth, Janney and Varney
Attys.

L. H. PARKER.
METHOD OF DISTRIBUTING LIQUID.
APPLICATION FILED DEC. 17, 1917.
1,311,840.
Patented July 29, 1919.
2 SHEETS—SHEET 2.
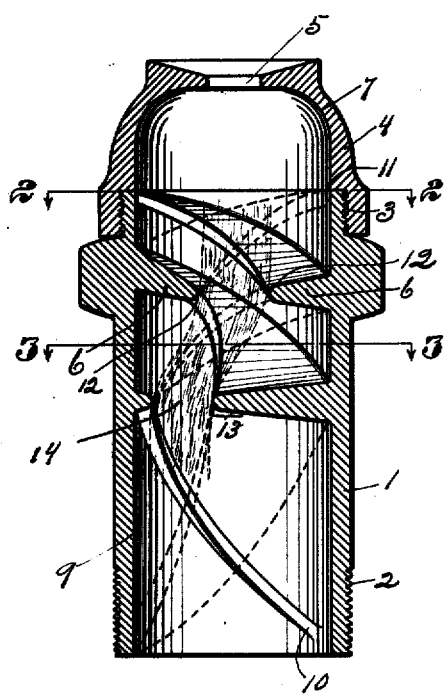
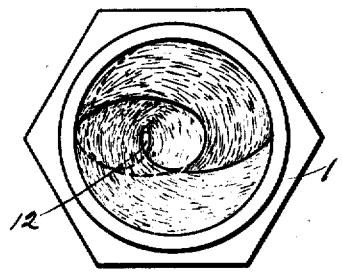
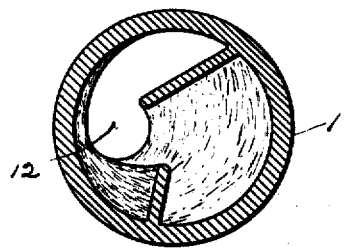
Inventor:
Lee H. Parker,

UNITED STATES PATENT OFFICE.

LEE H. PARKER, OF BOSTON, MASSACHUSETTS, ASSIGNOR TO SPRAY ENGINEERING COMPANY, OF BOSTON, MASSACHUSETTS, A CORPORATION OF MASSACHUSETTS.

METHOD OF DISTRIBUTING LIQUID.

1,311,840.  Specification of Letters Patent.  Patented July 29, 1919.

Application filed December 17, 1917. Serial No. 207,417.

*To all whom it may concern:*

Be it known that I, LEE H. PARKER, a citizen of the United States, and a resident of Boston, in the county of Suffolk and State of Massachusetts, have invented an Improvement in Methods of Distributing Liquid, of which the following description, in connection with the accompanying drawings, is a specification, like characters on the drawings representing like parts.

This invention relates to methods of distributing liquid which may contain more or less solid matter. While my method may be practised for any purpose, I preferably employ the same for cooling water in or in connection with cooling ponds or for condensers, ice plants, mills or any industry requiring a supply of cooling water or liquid. While my invention may be carried out in any suitable manner, I preferably practise the same by or with a nozzle, one form of which is herein disclosed and by which I form and distribute over preferably an extended area a spray composed of or comprising water or other liquid or suitable fluid, and in accordance with the disclosed and preferred embodiment of my invention, I discharge the liquid in a spray that is of substantially uniform homogeneity throughout.

Such a spray may be used in any of the defined relations or for any other suitable purpose, as, for example, for spraying effluent, for precipitating or for spraying coal dust or other foreign matter, for air washing, for condensing vapors, for humidifying air and for other purposes.

In carrying out my invention, I project the fluid in a flaring spray, and within the nozzle I preferably simultaneously produce a substantially central or axial jet and one or more surrounding jets which are preferably and for best results mixed within the mixing chamber of the nozzle, so that there is an effective mixture or blending of the jets before they issue in spray form from the mixing chamber, which latter is preferably so shaped as or is provided with means to cause impact and mixing of the several jets within the confined space of the mixing chamber of the nozzle.

I shall proceed to describe one form of nozzle or means whereby my method may be carried out, and to that end I have, in the accompanying drawing, disclosed a nozzle for practising my method.

In the drawing—

Figure 4:
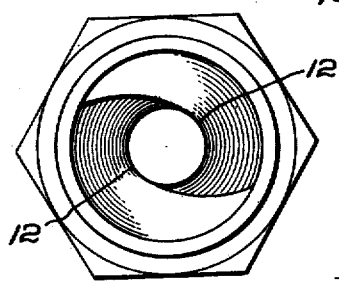

Fig. 4 is is a plan view thereof with the cap removed; and Figs. 5, 6 and 7 are respectively a vertical section and a transverse section on the line 6—6 and 7—7 of Fig. 5 of a slightly modified form of my invention.

Referring more particularly to the drawing, the nozzle herein shown comprises a shell or casing 1, the lower end of which is adapted to be attached to a hose or pipe for conveying the water or other liquid. To that end, I have herein represented said shell or casing 1 as threaded at its lower end 2. Preferably also the upper end of the shell or casing 1 is threaded as represented at 3 for the reception of the head or cap 4 of the nozzle which is interiorly threaded. The parts 1 and 4, however, need not be separate or detachable, since they might be formed in a single piece. Preferably for convenience in manufacture the members 1 and 4 are detachable.

The head or cap 4 is provided with a suitable discharge orifice 5 herein represented as circular. The interior of the head or cap 4 constitutes a mixing chamber, and it is preferably tapering or more or less dome shaped, so that the streams of liquid are caused to mix and intermingle prior to their discharge through the outlet 5.

In the patent to Eneas, No. 1,101,264. dated June 23, 1914, there is disclosed a spray nozzle having a central axially arranged sleeve or tube through which the central or axial jet passes, surrounding spiral vanes being provided to convey a plurality of streams of liquid in spiral directions, all the streams being caused to meet and intermingle within the mixing chamber.

It is the purpose of my invention to provide a central or substantially axial jet and one or more surrounding preferably spiral jets, although within the broad scope and purpose of my invention the surrounding jet or jets may be of any suitable character. Preferably the surrounding jets are formed by reason of the provision of spirals which may be of any suitable character, but instead of providing a central tube or sleeve for the central or substantially axial jet, I omit the physical tube or sleeve or other element defining the circumferential boundary of the central or axial jet. I, however, obtain the central or substantially axial stream or jet by positioning or forming the vanes or spirals or other elements by which the surrounding jet or jets are formed in such manner as to permit the passage of the central jet. In the disclosed embodiment of nozzle, I have accomplished this result by inwardly terminating the vane or vanes at a suitable distance radially from the axis of the nozzle so as to leave an unobstructed axial passage through which the liquid passes in a straight stream. I may, however, form or shape or position said vane or vanes in any way permitting the liquid to issue axially or substantially centrally between them or within the convolutions of the vane if a single one only be employed.

In accomplishing the result in this particular form of nozzle, I provide a plurality of spirals 6 of any suitable pitch and of any suitable radial extent. I have herein represented said spirals as cast or otherwise formed with the shell or casing 1, but they may be separately formed and attached thereto in any suitable manner, or positioned frictionally or otherwise within the nozzle. Preferably the said spirals terminate at or below the upper end of the shell or casing 1, that is, at or below the base of the mixing chamber, so that the liquid is discharged from the upper end of the spirals directly against the inner wall 7 of the mixing chamber and in such manner that the stream or streams which are outwardly thrown under centrifugal force, are guided by the inner surface 7 across the discharge opening 5 where or below which they meet the central jet herein indicated at 8, with the result that all the jets are thoroughly mixed and intermingled within the mixing chamber, and so that they issue therefrom in a flaring spray of substantially uniform homogeneity in cross section.

Preferably each of the spirals 6 at its lower end merges into the inner surface 9 of the shell or casing 1 as indicated at 10, and at the upper end each of said spirals again merges into the inner wall of the shell or casing as indicated at 11, thus presenting as little obstruction as possible to the spiral streams, particularly at the lower end thereof. In other words, the spiral or spirals 6 taper toward or are of gradually decreasing width at the points where they merge into the inner surface of the shell 9. They may, however, be of full width at both their upper and their lower ends or of any suitable intermediate widths.

Since, however, an important practice of my invention is the spraying of sewage, which contains more or less solid matter, I preferably so construct the spiral or spirals that they present the least resistance to the flow of the material, while preserving the flow of the material in a central jet, and in one or more outer jets which preferably are spiral. Preferably and as herein shown the inner or substantially central opening is of substantially one-third the total diameter of the vanes and is also of substantially the full diameter of the outlet from the nozzle.

Figure 3:
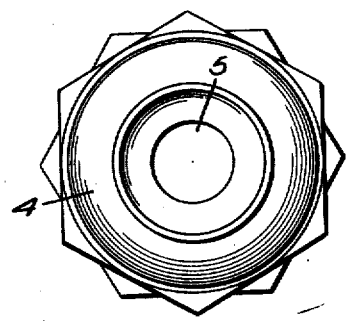
Fig. 3 is a plan view thereof.
Figure 1:
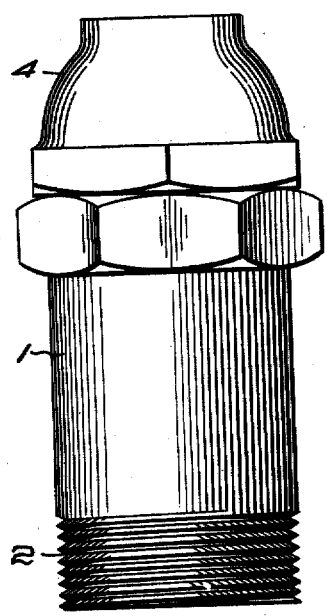
Figure 1 is a side elevation of such nozzle.
Figure 2:
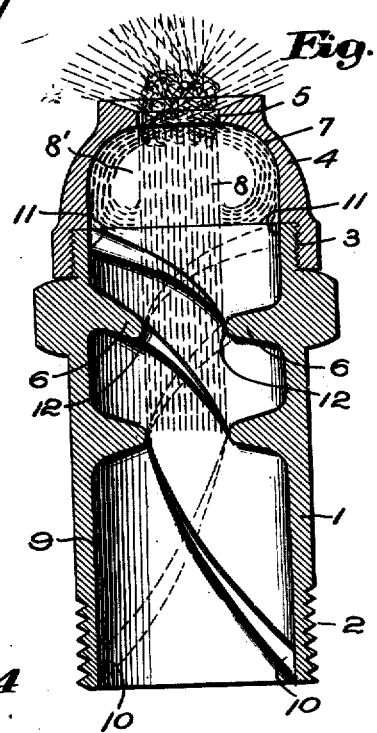
Fig. 2 is a vertical section thereof.

In order further to decrease the obstruction presented by the spiral or spirals, the inner edge 12 thereof is made rounding in cross section, as clearly indicated in Fig. 2.

Preferably each of the vanes is made of a decreasing pitch, so that the surrounding jet or jets are brought gradually from a flow in the direction of the entering stream to a flow in a direction at approximately right angles to the stream flow and approximately tangential thereto. Thus, the surrounding jet or jets are, with the least possible obstruction, brought into a direction of flow so as thoroughly to mix and intermingle with the central jet.

The central jet is preferably a straight one though it may be rotary in whole or in part. The cylindrical surface of such central jet may have more or less of a rotary motion, which may be caused in part by the effect of the surrounding jet or jets, which are not separated from the central jet by a physical wall.

The outer or surrounding jet or jets partake of their described paths, partly through centrifugal action, but the central jet is not under the influence of centrifugal action and maintains a substantially straight course into the mixing chamber 8.

In the said mixing chamber the central jet meets the surrounding jet or jets and thus the liquid or fluid of the jets is mixed and blended within a confined chamber or space. The mixed mass issues from the chamber in a spray which is of substantially uniform homogeneity throughout.

While the several jets or streams are mixed within the mixing chamber 8, substantially as set forth in the patent to Eneas, No. 1,101,264, I have found in practice that the described provision of means for effecting the formation of a central jet and one or more surrounding jets peculiarly coöperates with the mixing chamber and particularly in that the liquid from all the jets enters with a minimum of obstruction into the mixing chamber and in streams of such unimpeded force as to result in an even more effective mixing than heretofore. Moreover, I find that in some cases there is or may be a preliminary mixing at the very base of the mixing chamber, that is, at the point where the several streams enter thereinto. This is owing to the fact that no physical wall is present, so as accurately or exactly to define the shape or radial extent of the central jet or stream.

It is not essential to the carrying out of my method, in its broadest aspect, that the mixing chamber be employed, although it preferably and for best results is employed, since so far as I am aware I am the first to effect the formation of a central jet and one or more surrounding jets in substantially the manner herein described.

Within the scope, purpose and practice of my method, the so-called central or axial jet need not be wholly axial or throughout the entire extent thereof and particularly at its lower end. The vane or vanes 6 may be so shaped that only throughout a portion of the length thereof does the water pass through axially thus forming the central jet. The remainder of the length of the passage or space wherethrough passes the water that ultimately forms the central or axial jet may be somewhat spiral or not truly axial, so that as to a portion at least of the course of the liquid that ultimately becomes the central or axial jet or stream, there may be somewhat of a whirling action. Throughout the upper portion, however, of the course of the liquid that becomes the central jet, the liquid has a substantially truly axial or central location or relation with respect to the shell or casing 1.

Thus while for best results I prefer to have the central or axial jet truly central or axial through its entire extent and throughout substantially the entire length of the shell or casing 1, I may so construct the nozzle that the liquid does not immediately where it enters the nozzle partake of such central-stream character, provided it does so before the mixing chamber is reached. In other words, the liquid entering the nozzle might all come under the influence preliminarily of the vane or vanes, which are, however, so formed at their upper portions as to result in the formation of the said central jet or stream. This depends upon the shape and position of the inner edge of the vane or vanes. If a central plug or obstruction be provided at the base of the vane or vanes, this is within the scope of my invention, since such plug or obstruction, if present, is of restricted length, and the liquid immediately thereabove partakes of the said central-stream character. This form of my invention is represented in Figs. 5, 6 and 7, wherein the central or axial obstruction is represented at 13, and the opening which is at one side thereof is represented at 14. It is here shown as of substantially the same diameter as in Fig. 2. For the best results, and particularly where the nozzle is used in the spraying of sewage, or in the spraying of liquid containing more or less solid matter, to which use, however, my invention is in no wise limited, the central passage is approximately one third of the diameter of the entire passage through the nozzle and is approximately the diameter of the outlet from the nozzle.

While I have herein referred to several jets or streams which include a straight central jet and one or more surrounding jets, it is evident that in one aspect of my invention, the stream of liquid may be characterized as a single jet having a central, substantially straight portion and a surrounding portion that has a spiral, rotating movement imparted thereto. The several parts of such stream are caused to mix within a confined space, and thereafter they are caused to issue from the said confined space in a spray which is consequently of substantially uniform homogeneity.

The mixing of the parts of the streams within the confined space is effected not only by reason of the fact that the chamber wherein the mixing occurs is of decreasing diameter in cross section in the direction of the flow of the stream, but by reason of the fact that as hereinbefore set forth the surrounding jet or jets are guided across the discharge opening where or below which they meet the central jet, with the result that all the jets are thoroughly mixed and intermingled within the mixing chamber.

While I have specifically described one form of means whereby my method may be carried out, it is clearly to be understood that the method may be otherwise practised. The specific description of one form of means for practising the method therefore is not to be taken as a limitation of the scope of the method.

Claims:

1. That method of distributing liquid over an extended area which consists in simultaneously producing an inner jet and one or more surrounding jets physically unconfined along their adjacent edges, in causing said jets to traverse a confined space toward an outlet and in causing said surrounding jet or jets when in proximity to said outlet to flow markedly and with substantial abruptness toward said inner jet thereby to effect a marked mixing action within said confined space in proximity to said outlet.

2. That method of distributing liquid over an extended area which consists in simultaneously producing within a confined space a substantially straight jet physically unconfined peripherally, and one or more surrounding jets also physically unconfined at their inner edges and so that the diameter of the straight jet is at least substantially one third the diameter of the entire stream, in directing the surrounding jet or jets across the exit from the confined space, and thereafter causing them to meet and thoroughly to mix the particles of the straight jet, whereby all the jets are broken up and intermingled within the confined space, and in causing all said jets to issue from said confined space.

3. That method of distributing liquid over an extended area which consists in simultaneously producing within a confined space one or more inclined outer jets and an inner jet, the diameter of such inner jet being at least one third the diameter of the entire stream, said inner jet being physically unconfined and the outer jet or jets being physically unconfined at the inner edge or edges thereof.

4. That method of distributing liquid over an extended area which consists in simultaneously producing within a confined space a substantially straight jet physically unconfined peripherally, and one or more surrounding jets also physically unconfined at their inner edges, in causing said jet to traverse said confined space toward the outlet and in causing said surrounding jet or jets when in proximity to said outlet to flow markedly and with substantial abruptness toward said straight jet, thereby to effect a marked mixing action within said confined space in proximity to said outlet.

5. That method of distributing liquid containing solid matter such as sewage over an extended area, which consists in simultaneously producing within a confined space of sufficient diameter to permit the flow of such material, a peripherally unconfined jet of such liquid and one or more surrounding jets of such liquid unconfined at their inner edges and causing the preliminary or partial mixing of said jets adjacent the entrance point of said jets into said confined space and at a zone in proximity to the exit from said space in directing the surrounding jet or jets across said exit, but within the said space and there causing them to meet and thoroughly to mix with the particles of the straight jet, whereby all the jets are broken up and intermingled within said confined space and in causing all said jets to issue from said confined space in a stream that is of substantially the full diameter of said peripherally unconfined jet.

6. That method of distributing liquid over an extended area which consists in simultaneously producing within a confined space a central, substantially straight, peripherally unconfined jet and a plurality of spiral jets unconfined along their inner edges, and in causing said jet to traverse said confined space toward the outlet and in causing said surrounding jet or jets when in proximity to said outlet to flow markedly and with substantial abruptness toward said straight jet, thereby to effect a marked mixing action within said confined space in proximity to said outlet.

7. That method of distributing liquid over an extended area which consists in producing a jet within a confined space, the central portion of which jet is substantially straight and an outer or surrounding portion of which has a spiral motion, in causing the portions of said jet to traverse said confined space within the outlet, and in causing the surrounding portions of said jet when in proximity to said outlet to flow markedly and with substantial abruptness toward the straight portion of said jet, thereby to effect a more marked mixing action within the confined space in proximity to said outlet.

8. That method of distributing liquid over an extended area which consists in imparting a movement within a confined space in a substantially straight line to one portion of a jet and a movement in a spiral direction to the surrounding or enveloping portions of the jet in causing the portions of said jet to traverse said confined space toward the outlet and in causing the surrounding portions of said jet when in proximity to said outlet to flow markedly and with substantial abruptness toward the straight portion of the jet, thereby to effect a more marked mixing action within said confined space in proximity to said outlet.

9. That method of distributing liquid over an extended area which consists in imparting a movement within a confined space in a substantially straight line to one portion of a jet and which portion is of substantially the full diameter of the mixture as discharged, and a movement in a spiral direction to the surrounding or enveloping portions of the jet, in causing an intensified mixture of all the portions of the said jet within said confined space in proximity to the exit therefrom, and finally in causing the issuance of the mixed particles of said jet from said confined space in a spray of substantially uniform homogeneity.

In testimony whereof I have signed my name to this specification.

LEE H. PARKER.

Copies of this patent may be obtained for five cents each, by addressing the "Commissioner of Patents, Washington, D. C."